No. 649,849. Patented May 15, 1900.
G. LANG.
ANIMAL YOKE.
(Application filed Mar. 17, 1900.)

(No Model.)

WITNESSES:
Jos. A. Ryan
Edw. W. Byrn.

INVENTOR
George Lang
BY Munn & Co.
ATTORNEYS

UNITED STATES PATENT OFFICE.

GEORGE LANG, OF BILLINGS, OKLAHOMA TERRITORY.

ANIMAL-YOKE.

SPECIFICATION forming part of Letters Patent No. 649,849, dated May 15, 1900.

Application filed March 17, 1900. Serial No. 9,069. (No model.)

*To all whom it may concern:*

Be it known that I, GEORGE LANG, of Billings, in the county of Noble, Oklahoma Territory, have invented a new and useful Improvement in Animal-Yokes, of which the following is a specification.

My invention relates to animal-yokes of that class which are provided with an extension that is designed to be entangled with or brought in contact with a fence in any attempt of the animal to cross the same. Such devices are sometimes called "animal-pokes," and one form of them includes rocking bars bearing barbs which when the poke strikes the fence cause the shaft to rock and thrust the barbs into the neck of the animal, and thus deter it from advancing farther.

My invention belongs to this latter type; and it consists in a simple and practical form of yoke operating on this principle, which I will now proceed to describe with reference to the drawings, in which—

Figure 1:
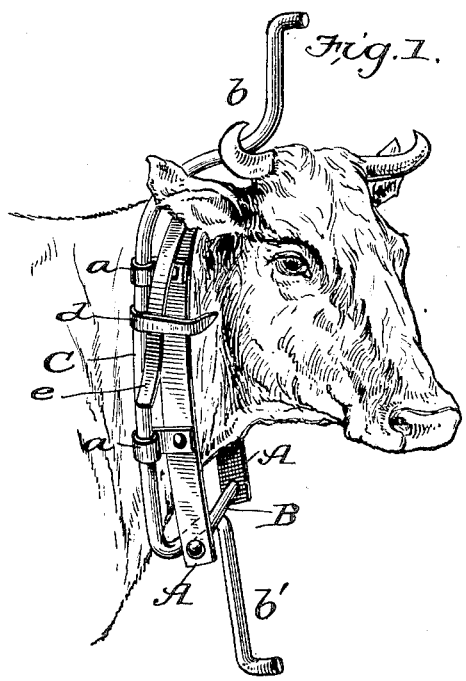
Figure 2:
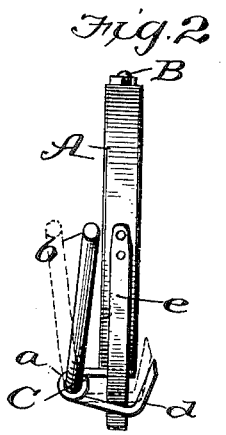

Figure 1 is a perspective view of the yoke with the head of an ox shown in position in the same. Fig. 2 is a top view.

A represents a yoke of an inverted-U shape, made of either metal or wood and having its two lower ends perforated and adapted to be connected by a detachable bolt or bar B or by a strap, if desired.

To one of the sides of the yoke there are riveted two offsetting clips a a, having their ends bent over to form tubular bearings in which is contained a rock-shaft C. This rock-shaft is bent into a crank b at its upper end and a crank b' at its lower end, which extend into the middle vertical line of the yoke and are bent again, the upper one b being extended vertically upward and the lower one b' being extended downward and both terminating in a forwardly-projecting hook.

At a point between the two bearings a a of the rock-shaft an arm d is rigidly fastened to the rock-shaft in right-angular position and extends forwardly past the yoke and has its end then turned inwardly toward the neck of the animal and is pointed to form a sharp barb.

To the upper end of the yoke there is permanently attached a flat spring e, which extends down alongside the yoke and bears against the pointed arm d and holds it normally away from the animal's neck. When, however, the animal in seeking to get through or over a fence brings the cranked upper or lower end of the rock-shaft against the fence, the rock-shaft is turned and the barbed arm is thrown inward against the tension of the spring, and the barb pricking the neck of the animal causes it to back out and be prevented from crossing.

Having thus described my invention, what I claim as new, and desire to secure by Letters Patent, is—

1. An animal-yoke consisting of an inverted-U-shaped bar having attached to one side clips with tubular bearings, a rock-shaft arranged in said bearings and having its ends above and below said bearings bent into the vertical middle line of the yoke and then extended vertically, a barbed arm fixed rigidly to the rock-shaft and turned inwardly, and a spring for holding said arm away from the yoke, as described.

2. An animal-yoke consisting of an inverted-U-shaped bar having attached to one side clips with tubular bearings, a rock-shaft arranged in said bearings and having its ends above and below said bearings bent into the vertical middle line of the yoke, a barbed arm rigidly attached to the rock-shaft at right angles and turned inwardly, and a spring attached to the yoke and bearing against the said arm substantially as and for the purpose described.

3. An animal-yoke consisting of an inverted-U-shaped bar having attached to one side clips with tubular bearings, a detachable connection for the lower ends of the yoke, a rock-shaft arranged in said bearings and having its ends above and below said bearings bent into the vertical line of the yoke, a barbed arm rigidly attached to the rock-shaft at right angles and turned inwardly, and a spring attached to the yoke and bearing against the said arm substantially as and for the purpose described.

4. An animal-yoke consisting of a U-shaped bar having hinged to one of its sides a rock-shaft with its ends bent twice and carried into the middle vertical line of the yoke, a right-angular barbed arm attached to the rock-shaft and extending forwardly, inwardly and around the yoke and a spring for holding said barbed arm back substantially as described.

5. An animal-yoke consisting of a U-shaped bar having a rock-shaft hinged thereto about a vertical axis and having a cranked end extension, a rigidly-attached barb-arm, and a spring for holding said arm away from the U-shaped bar substantially as shown and described.

In testimony whereof I have signed my name to this specification in the presence of two subscribing witnesses.

GEORGE LANG.

Witnesses:
 EUGENE W. MOUTRAY,
 CLYDE E. MANLOVE.